US007295809B2

(12) United States Patent
Moore

(10) Patent No.: US 7,295,809 B2
(45) Date of Patent: Nov. 13, 2007

(54) PORTABLE AUDIO PLAYBACK DEVICE WITH BASS ENHANCEMENT

(75) Inventor: Richard A. Moore, Raleigh, NC (US)

(73) Assignee: Sony Ericsson Mobile Communications AB (SE)

( * ) Notice: Subject to any disclaimer, the term of this patent is extended or adjusted under 35 U.S.C. 154(b) by 839 days.

(21) Appl. No.: 10/199,453

(22) Filed: Jul. 19, 2002

(65) Prior Publication Data

US 2004/0014426 A1 Jan. 22, 2004

(51) Int. Cl.
*H04B 7/00* (2006.01)

(52) U.S. Cl. .................. 455/41.2; 455/41.1; 455/41.3; 381/111

(58) Field of Classification Search ............... 455/41.1, 455/41.2, 41.3, 66.1; 379/88.01, 88.29; 381/111, 381/112, 113, 114, 115
See application file for complete search history.

(56) References Cited

U.S. PATENT DOCUMENTS

| | | | |
|---|---|---|---|
| 4,424,416 A | 1/1984 | Fukouka | |
| 5,193,208 A * | 3/1993 | Yokota et al. | 725/80 |
| 5,666,422 A * | 9/1997 | Harrison et al. | 381/18 |
| 5,668,884 A * | 9/1997 | Clair et al. | 381/82 |
| 5,673,323 A * | 9/1997 | Schotz et al. | 381/2 |
| 5,814,752 A * | 9/1998 | Rivera | 84/711 |
| 5,946,343 A * | 8/1999 | Schotz et al. | 375/141 |
| 6,064,699 A * | 5/2000 | Law | 375/244 |
| 6,111,960 A | 8/2000 | Aarts et al. | |
| 6,337,913 B1 * | 1/2002 | Chang | 381/14 |
| 6,424,820 B1 * | 7/2002 | Burdick et al. | 455/41.1 |
| 6,591,085 B1 * | 7/2003 | Grady | 455/42 |
| 6,809,635 B1 * | 10/2004 | Kaaresoja | 340/407.1 |
| 2002/0048381 A1 * | 4/2002 | Tamayama | 381/307 |
| 2004/0190529 A1 * | 9/2004 | Hara | 370/395.42 |

FOREIGN PATENT DOCUMENTS

EP 0907122 4/1999

OTHER PUBLICATIONS

PCT Notification of Transmittal of the International Search Report or the Declaration dated Jun. 1, 2004.

* cited by examiner

*Primary Examiner*—Sanh D. Phu
(74) *Attorney, Agent, or Firm*—Coats & Bennett, P.L.L.C.

(57) ABSTRACT

Wirelessly linking a portable audio device to an external audio system permits the external audio system to generate audible signals that enhance local playback of audio by the portable device. For example, the portable device wirelessly transmits lower frequency components of an audio signal to a subwoofer system for reproduction of bass frequencies extending below the playback capability of the portable device. In this manner, the external audio system provides bass enhancement for the portable audio device. Wireless transmissions between the portable audio device and the external audio system may be, but are not limited to, optical or radio frequency (RF) transmissions. Where RF signaling is used, the wireless link may be based on wireless network links, such as those supported by Bluetooth and 802.11*b* standards, or based on, for example, dedicated RF interfaces.

76 Claims, 5 Drawing Sheets

PORTABLE AUDIO PLAYBACK DEVICE WITH BASS ENHANCEMENT

BACKGROUND OF THE INVENTION

The present invention relates to portable audio devices, and more particularly, relates to portable audio devices capable of communicating with external audio systems to provide enhanced audio playback.

Advances in digital electronic technology have led to a rapid growth in portable audio devices. In particular, portable audio devices such as audio CD players, digital audio players, FM/AM radio receivers, televisions, and DVD players have become increasingly popular among consumers as they have become small, lightweight, and easy for an individual to carry. Most such devices include small, built-in speakers or provide attached headphones that, in some instances, offer relatively good audio quality.

However, the size limitations of speakers for such devices significantly limit their ability to generate significant sound pressure levels across the full audio range. More particularly, small speakers commonly used in portable audio devices, or in audio headphones intended for attachment to such devices, simply cannot generate significant bass output. As a result, audio playback often lacks the full range sound available from audio systems employing full-size speakers. Such full-size speakers use one or more relatively large audio drivers, commonly referred to as "woofers" or "sub-woofers," to generate the lower frequency components of an audio signal. While no specific frequency cutoffs exist, frequency components below 100 Hz and extending down to 20 Hz or lower are commonly regarded as the bass components of an audio signal. At these frequency ranges, there is simply no substitute for physically large, high-powered audio drivers, which practically cannot be included in a portable audio device.

SUMMARY OF THE INVENTION

The present invention provides a method and apparatus to enhance audio playback from a portable audio device by wirelessly linking the portable audio device to an external audio system offering extended audio output capabilities. Because size constraints imposed on the speakers included in portable audio devices limit their ability to reproduce lower frequency signals, exemplary embodiments of the present invention use the external audio system to provide bass enhancement. In an exemplary embodiment, the portable audio device generates a first audible signal responsive to an audio signal, and transmits lower frequency components of the audio signal to the external audio system, which generates a second audible signal responsive to the low frequency components of the audio signal being played by the portable device.

Transmission of low frequency audio information from the portable device to the external audio system may be thought of as transmitting an "enhancement signal." Generally, the portable device processes the audio signal such that generation of the first audible signal is time aligned with generation of the second audible signal at the external audio system. That is, the portable device delays local playback to account for any link delays associated with transmitting the enhancement signal to the external audio system via the wireless link to ensure that bass enhancements in the second audible signal are correctly timed with respect to the first audible signal.

In exemplary embodiments, the wireless link comprises at least one data channel suitable for transmitting the enhancement signal information. In a preferred embodiment, the enhancement signal is sent via a relatively low data rate channel, which is suitable for the low-frequency information content of the enhancement signal. The wireless link may comprise multiple channels such that the enhancement signal may be sent while carrying on other communication functions.

As an example, the portable audio device might receive streaming audio content on a high data rate channel of the wireless link, and transmit an associated enhancement signal for playback enhancement of the streaming audio on a second, lower data rate channel of the wireless link. Moreover, the portable audio device might time-share the second channel with other applications or device functions, such as where the portable audio device comprises a cellular phone or laptop computer with music playback functionality.

In an exemplary time-sharing scenario, the portable audio device supports a telephony application or other communication application in addition to its playback enhancement functionality. When its communication application is inactive, the portable audio device uses the wireless link to transmit the enhancement signal. Such transmission is then suspended or otherwise halted once the communication application becomes active and the wireless link channel used to carry the enhancement signal is then used for the communication function. As part of this time-sharing functionality, the portable audio device might automatically suspend both local playback and enhancement signal transmission upon activation of the communication function.

DETAILED DESCRIPTION OF THE INVENTION

Figure 1:
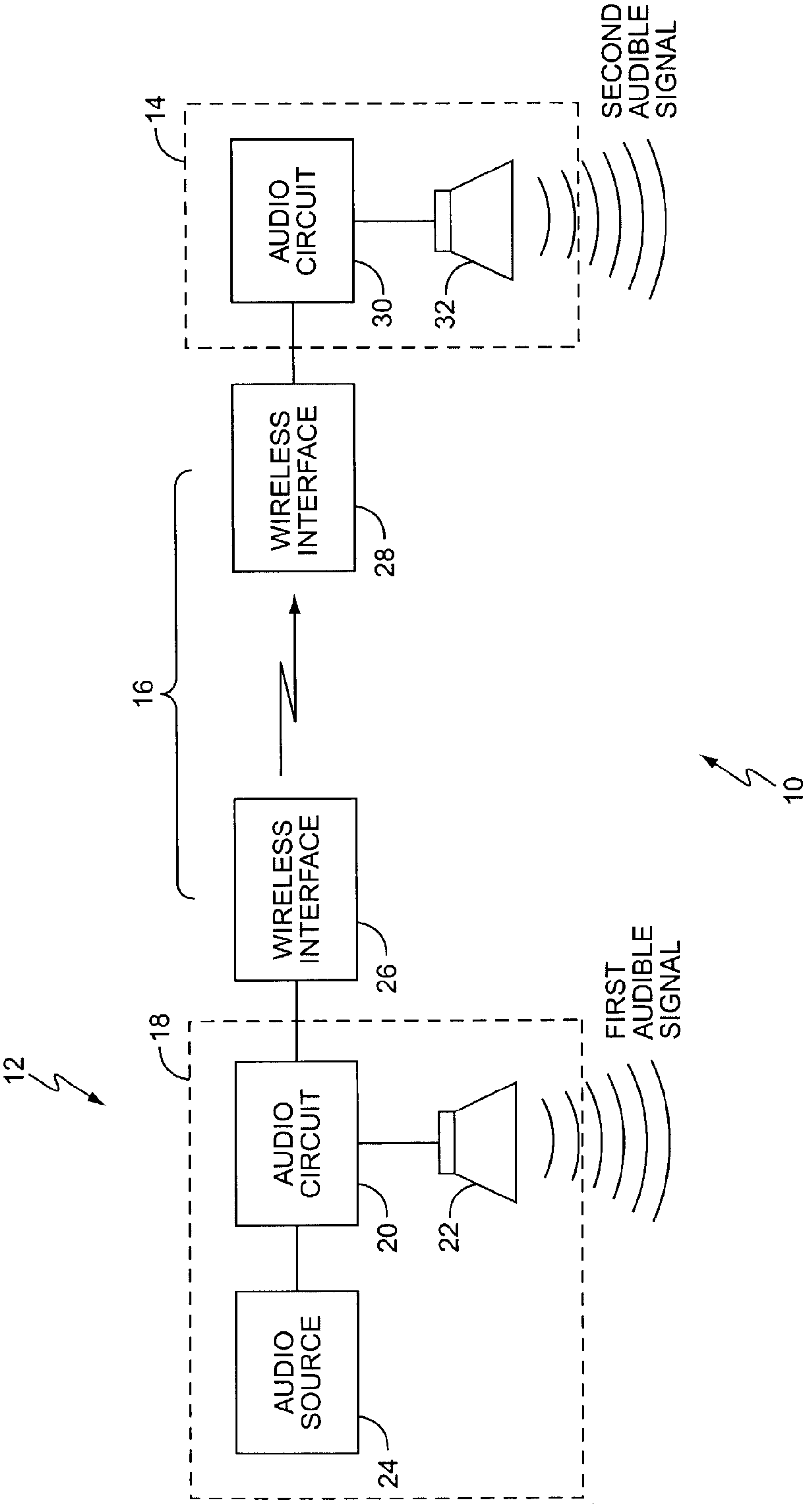
FIG. 1 is a diagram of an exemplary system for audio playback enhancement.

FIG. 1 illustrates an exemplary audio playback system according to the present invention. The audio playback system, generally referred to by the numeral 10, comprises a portable audio device 12 and an external audio system 14 communicating over a wireless link 16. In operation, portable audio device 12 provides local audio playback, which is enhanced by audio playback at audio system 14 responsive to a playback enhancement signal transmitted from device 12 to audio system 14 via wireless link 16. That is, external audio system 14 generates audible output responsive to the enhancement signal to enhance the audible output of portable audio device 12.

In an exemplary embodiment, portable audio device 12 comprises an audio playback unit 18 including an audio circuit 20, one or more speakers 22 and audio source 24, and a wireless interface 26 for communicating via wireless link 16. A second wireless interface 28 is associated with or included in audio system 14, which, in an exemplary embodiment, comprises an audio circuit 30 and one or more speakers 32.

Portable audio device 12 outputs a first audible signal through associated speakers 22. Speakers 22 are typically on-board speakers or headset speakers that connect to the portable audio device 12. In either case, the speakers 22 generally are physically small and lack the frequency range of full-size speakers. The external audio system 14, in contrast, typically includes larger speakers 32 having a lower frequency range than the portable audio device's speakers 22. More particularly, external audio system 14 will typically include woofers and/or subwoofers for reproducing low frequency components of an audio signal.

Thus, in exemplary playback enhancement operation, the portable audio device 12 generates a first audible signal responsive to an audio signal, and transmits at least the lower-frequency components of the audio signal to the external audio system 14 such that it outputs a second audible signal through speakers 32. Here, the second audible signal includes at least the lower-frequency components of the audio signal being played back by portable audio device 12, and thus provides bass enhancement for portable audio device playback.

As noted, such bass enhancement is particularly meaningful where the bass response of portable device 12 is limited because of the necessarily small size of its included speakers 22. Including the low-frequency components of the audio signal of interest in the enhancement signal allows the audio system 14 to enhance playback of the audio signal by reproducing the low-frequency components of the audio signal. The external audio system 14 thus serves, in this context, as a remote sub-woofer for the portable audio device 12.

Figure 2:
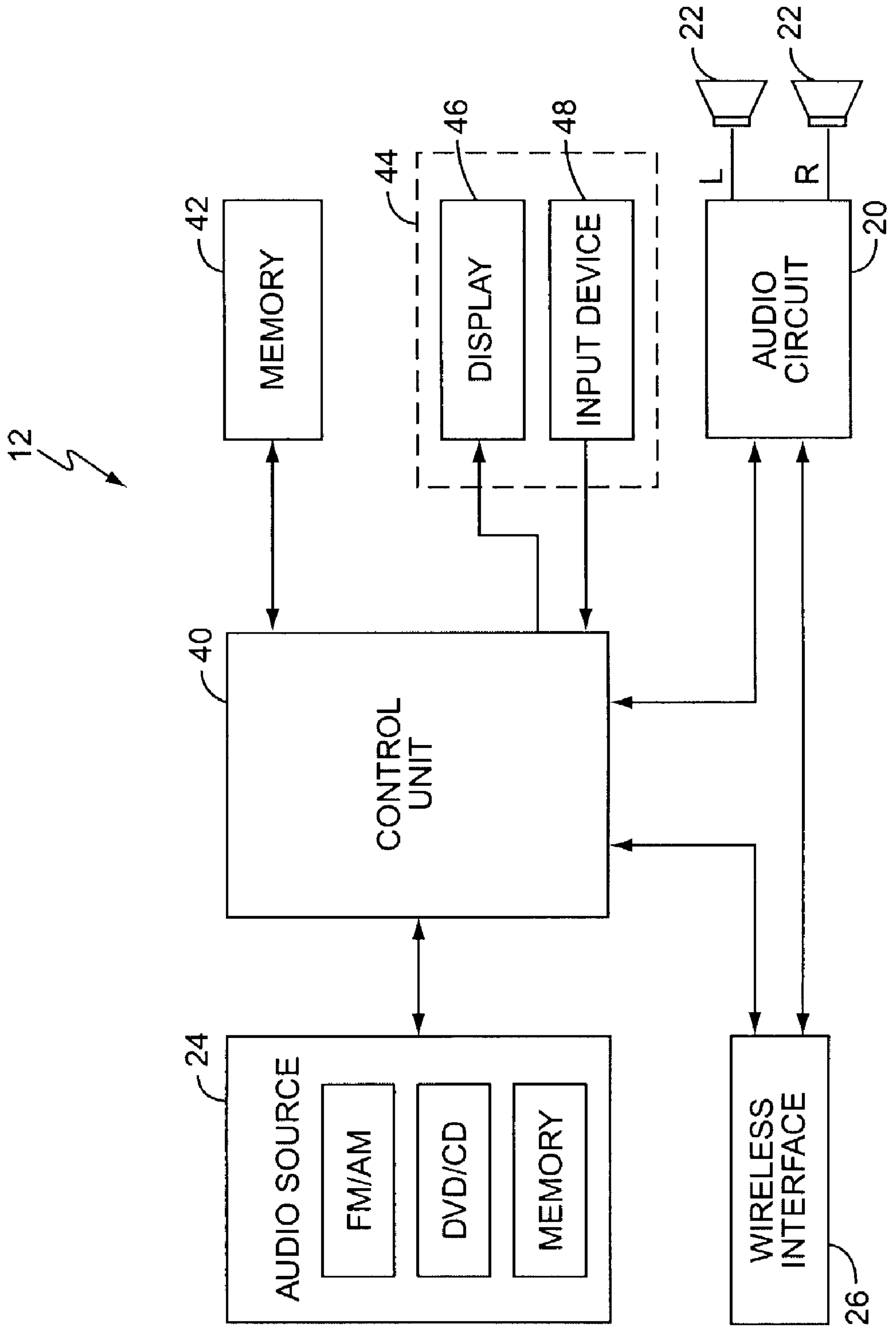
FIG. 2 is a diagram of exemplary details for the portable audio device of FIG. 1.

FIG. 2 illustrates exemplary details for portable audio device 12. Portable audio device 12 includes a main control unit 40 for controlling the operation of the portable audio device 12, a memory 42 for storing control programs and data used by the portable audio device 12 during operation, the audio source 24 for storing or providing audio content played back by the portable audio device 12, a user interface 44, the wireless interface 26, the audio circuit 20, and speakers 22.

Audio source 24 may comprise any type of audio storage media, such as a compact disc (CD), digital audio tape (DAT), digital versatile disc audio (DVD/Audio), or non-volatile memory containing audio content such as MPEG Layer 3 (MP3) audio content. Generally, audio content may be stored in either digital or analog format. Audio source 24 may also comprise a radio receiver adapted to receive radio signals that include audio content. Thus, in at least some embodiments, wireless resources in wireless interface 26 may provide audio information for playback by device 12.

The user interface 44 provides a means for the user to control the operation of the portable audio device 12. The user interface 44 may include a display 46 and a keypad or other user input device 48. The keypad or other user input device 48 enables the user to enter commands and select options. The display 46 allows the user to view prompts, menu options, or information concerning operation of device 12.

The audio circuit 20 accepts audio inputs from the audio source 24 in either analog or digital format and provides basic analog audio outputs to the speakers 22. Note that audio circuit 20 may receive audio content indirectly through controller 40, particularly where such content is in digital format, or may obtain such content directly from audio source 24. Audio circuit 20 further provides the enhancement signal, or information for generation of the enhancement signal, to the wireless interface 26 for transmission over the wireless link 16 to the external audio system 14.

In the context of the present invention, wireless interface 26 is used to transmit the enhancement signal from portable audio device 12 to audio system 14 via wireless link 16. However, as will be detailed later herein, wireless interface 26 supports, in at least some embodiments, additional functionality. For example, wireless interface 26 may be used to transmit playback enhancement control information to audio system 14 via its associated wireless interface 28. Such control information can include, but is not limited to, gain/volume control, muting, etc. Further, wireless interface 26 may include transceiver resources such that it can receive, for example, audio content for playback by device 12 while simultaneously transmitting the enhancement signal to the external audio system 14.

Figure 3:
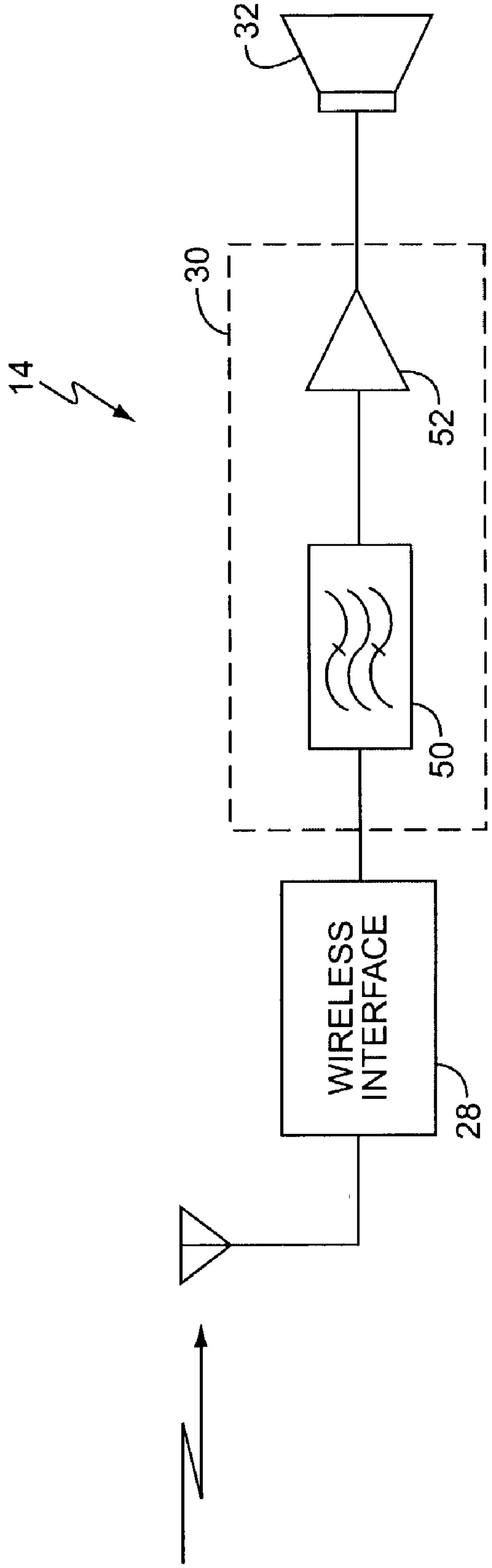
FIG. 3 is a diagram of exemplary details for the external audio system of FIG. 1.

FIG. 3 illustrates exemplary details for external audio system 14. The external audio system 14 may, for example, comprise an audio circuit 30 and at least one speaker 32. Audio circuit 30 couples to the wireless interface 28, which may be internal or external to the audio system 14, to receive the enhancement signal from the portable audio device 12. Thus, the wireless interface 28 receives the enhancement signal from the portable device 12 and passes the audio enhancement signal to the audio circuit 30 for playback.

Depending on implementation details, the wireless interface 28 might generate a line-level output signal responsive to its receiving the enhancement signal via the wireless link 16. Such a pre-amplifier type output signal is particularly suitable where audio circuit 30 comprises, for example, an audio amplifier or stereo receiver having one or more audio source inputs compatible with pre-amplifier level signals. Those skilled in the art will recognize the many possibilities for inputting enhancement signal information into audio circuit 30. Regardless of signal format, audio circuit 30 generates a speaker-level output signal responsive to the enhancement signal, such that speaker 32 is driven with a higher power audio signal responsive to the audio enhancement signal from the portable audio device 12.

The audio circuit 30 may include a low pass filter 50 and an audio amplifier 52. Band pass filter 50 advantageously removes the high frequency components and noise from the received enhancement signal. Amplifier 52 amplifies the enhancement signal for output to speaker 32. As noted earlier, the speaker 32 might comprise a sub-woofer, or one or more other bass drivers of substantial physical size relative to the speakers 22 in the portable device 12. Of course, one of the further advantages to relying on audio system 14 for bass reproduction is that it more readily provides the potentially significant power levels needed to generate sufficient sound pressure levels at the lower frequencies. That is, portable device 12 is typically battery powered and thus has limited power available for audio playback.

In earlier described operational details, it was noted that portable audio device 12 generates a first audible signal responsive to an input audio signal and transmits an audio enhancement signal containing low frequency components of the audio signal to the external audio system 14 over wireless link 16. In turn, audio system 14 generates a second audible signal that enhances the first audible signal, such as by reproducing the lower frequency components of the audio signal. However, generation of the second audible signal involves transmission of the enhancement signal via wireless link 16, which typically involves some amount of link delay.

Portable audio device 12 includes, in exemplary embodiments, a delay matching function such that audio playback at the portable audio device 12 is time-aligned with enhancement playback at the external audio system 14. Thus, portable audio device 12 introduces a playback delay for the first audible signal relative to the audio signal, such that its local generation of the first audible signal is delayed by an amount matched to the relative delay associated with generation of the second audible signal at the external audio system 14. More particularly, the portable audio device 12 introduces a relative playback delay for its local playback to at least account for the link delays associated with transmission of the enhancement signal over wireless link 16.

Figure 4:
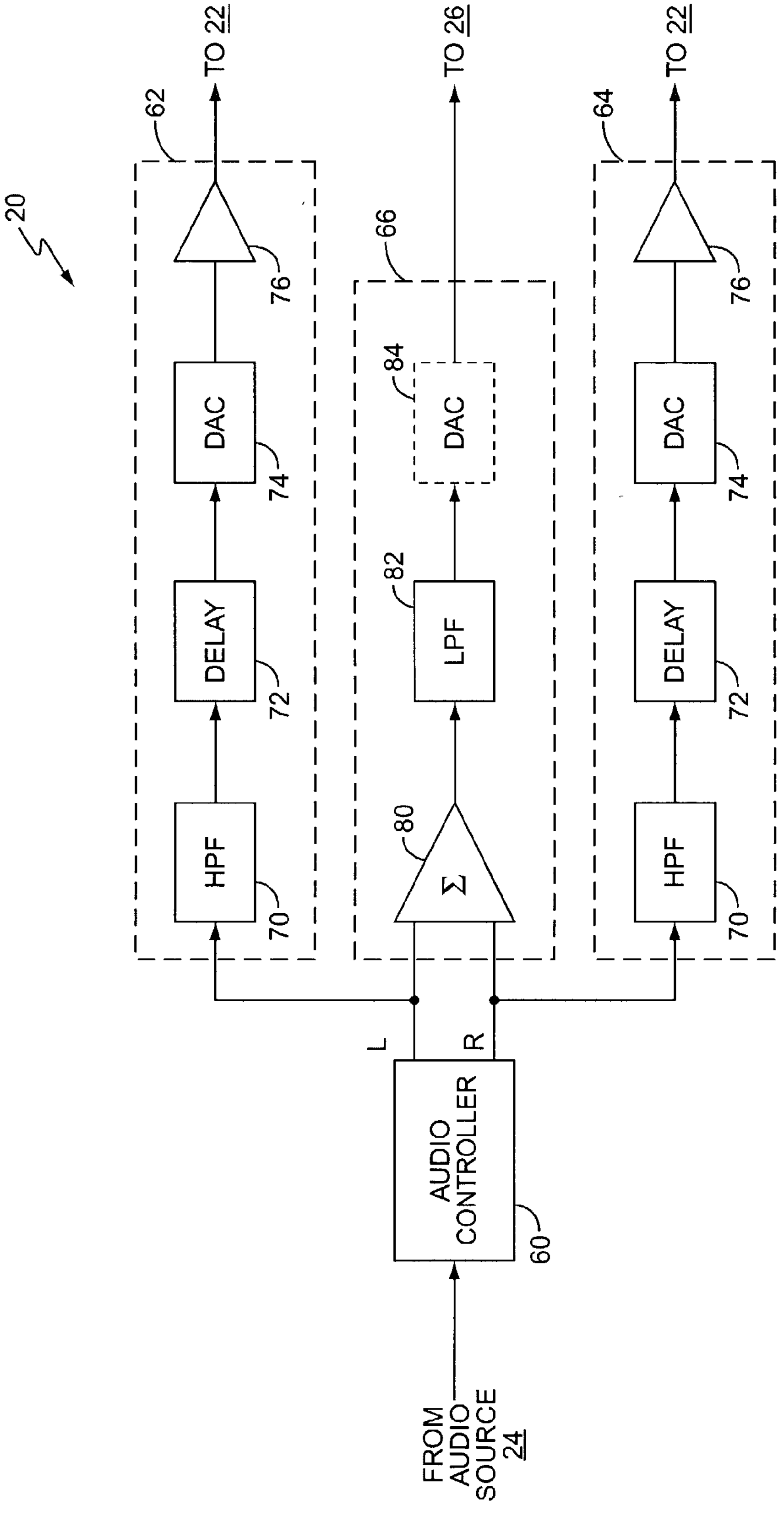
FIG. 4 is a diagram of exemplary audio signal processing at a portable device.

FIG. 4 illustrates the audio circuit 20 of the portable audio device 12 in more detail. It should be noted that FIG. 4 illustrates functional elements of the audio circuit 20, and is not necessarily meant to imply any particular physical arrangement of those elements. The illustrated functions could be integrated into a common processing element, such as a digital signal processor (DSP), and, in general, might be performed in a mix of hardware and software. The type of processor used may depend on the nature of portable device 12.

Thus, audio controller 60 may be a digital signal processor (DSP), or a microprocessor or micro-controller executing stored program instructions supporting playback and playback enhancement functions, or may be some other form of processing logic, such as a Complex Programmable Logic Device (CPLD), Field Programmable Gate Array (FPGA), or Application Specific Integrated Circuit (ASIC). Audio controller 60 might perform other functions besides audio processing. For example, the portable audio device 12 could include a single processor serving both as the audio circuit 20, or some portion thereof, and as the main control unit 40.

Regardless, an exemplary audio circuit 20 comprises audio controller 60, a left channel circuit 62, a right channel circuit 64, and an enhancement channel circuit 66. Audio controller 60 reads or otherwise receives audio content from, for example, audio source 24, and outputs an audio signal. In the disclosed embodiment, the audio signal output by the audio controller 60 is a stereo signal having left (L) and right (R) signal components, which are fed respectively to the left and right channels 62, 64 of audio circuit 20.

The left and right channel circuits 62 and 64 each include a high pass filter 70, a delay element 72, a converter 74, and an amplifier 76. High-pass filter 70 removes lower frequency components of the channel's audio signal, which may improve audio performance of speakers 22. The filtered audio signal feeds into the delay element 72, which may comprise, for example, a memory to buffer the audio signal. The filtered and delayed audio signal then feeds into converter 74, which converts the audio signal to an analog signal for output to a respective speaker 22. Note that the digital-to-analog converters 74 generally are not needed where the audio signal is processed in analog format. The analog signal drives amplifier 76, which outputs a responsive amplified output signal suitable for driving the associated speaker 22. Thus, speakers 22 generate the first audible signal at the portable device 12 responsive to the audio signal output by audio controller 60.

Audio controller 60 also outputs the audio signal to the enhancement channel circuit 66, which may operate as a low-frequency channel. Enhancement channel circuit 66 includes a summer 80, a low pass filter 82, and may include a digital-to-analog converter 84. Summer 80 combines the left and right audio signals output by audio controller 60 to form a combined signal for input to low pass filter 82 (assuming that a stereo signal is output from audio controller 60). Low pass filter 82 removes higher frequency components of the combined audio signal. The low frequency components of the combined audio signal, i.e. the enhancement signal, output by the low pass filter 82 may then be converted to analog format by digital-to-analog converter 84 for transmission to the external audio system 14 via wireless interface 26. If the combined audio signal is transferred to wireless interface 26 in digital rather than analog format, converter 84 is not needed.

In an exemplary arrangement, the frequency roll-off points for high pass filters 70 are matched to the roll-off of low pass filter 82 in the low frequency channel. With such matching, the filters 70 and 82 operate as an audio crossover filter to keep the lower frequency cutoff of the portable device's speakers 22 matched to the frequencies transferred to the external audio system 14 for playback enhancement. Those skilled in the art will appreciate that the filtering/conversion circuitry is reduced where the audio signal is monaural, i.e., single-channel format. Thus, with a monaural signal, summer 80 is not needed, and either the left or right channel circuits 62 or 64 of the audio circuit 20 may be omitted. Of course, it may be desirable for the audio circuit 20 to generally accommodate stereo and other multi-channel formats, along with monaural audio signal formats.

Proper delay matching between the first and second audible signals ensures that audible output from external audio system 14 is properly time-aligned with the audible output from portable audio device 12. While there may be various sources of delay within the overall audio signal path(s), the wireless link 16 generally accounts for a significant part of the delay of the second audible signal relative to the audio signal output by audio controller 60. Thus, delay elements 72 introduce delays in the audio signal path associated with generation of the first audible signal at the portable audio device 12.

Delay elements 72 operate to impart essentially the same delay to the first audible signal relative to the audio signal output by audio controller 60, as that imparted to the second audible signal by the wireless link 16. Such delay matching ensures proper time alignment between the first audible signal output by portable device 12 and the second audible signal output by external audio system 14. That is, proper delay matching ensures that the bass enhancements provided by audio system 14 are in phase with respect to the music or other audio played back at the portable device 12.

Calculation of the required delay may be based on a default delay value assumed for the wireless link 16, and for the audible signal delay from the external audio system 14 relative to the user, plus any delays associated with audio signal conversion and amplification, although these additional delays are generally small. One approach permits tuning of the delay elements 72 to achieve essentially perfect delay matching. For example, portable device 12 may permit the user to set or otherwise adjust the delay imparted to the first audible signal to accommodate the actual delay of second audible signal relative to the audio signal. However, a default delay value matched to the characteristics of wireless link 16, possibly with additional delay time for the audible signal delay, is normally all that is needed.

Implementation of the delay elements 72 depends upon whether the audio signal output by audio controller 60 is processed in digital or analog format. In the illustration, delay elements 72 comprise digital delay elements that are easily implemented by buffering the audio signal in either hardware or software. For analog signal buffering, analog delay elements may be used, such as analog delay lines. For greater convenience, the audio signal might be converted to digital format, delayed, and then converted back to analog.

Even where the audio signal is processed in digital format, it is generally necessary to convert it to analog format, as most types of speakers require an analog input signal to produce the desired audible output. Thus, converters 74 convert, respectively, the left and right audio signals into analog signals suitable for input to amplifiers 76. Converters 74 might comprise individual converters or might comprise a portion of a larger, multi-channel digital-to-analog converter (DAC). Those skilled in the art will recognize that various DAC types may be used, such as current-mode or voltage-mode DACs, depending upon the input characteristics of the amplifiers 76, and the desired audio fidelity.

The wireless interfaces 26 and 28 may be based on, for example, the Bluetooth wireless networking standard promulgated by the Bluetooth Special Interest Group. While an exemplary embodiment of the invention as described herein uses a Bluetooth-based wireless link 16, it should be understood that other wireless network types might also used, such as those based on IEEE 802.11b or other standards.

Bluetooth is a standard for a universal radio interface in the 2.45 GHz frequency band that enables portable electronic devices to connect and communicate wirelessly via short-range, ad hoc networks. An overview of the Bluetooth standard is contained in the article entitled "The Bluetooth Radio System" authored by Jaap Haartsen, which can be found in IEEE Personal Communications, February 2000. For the purposes of the present invention, only Bluetooth features of immediate interest are described herein.

The Bluetooth standard incorporates search procedures that allow wireless devices to form ad hoc networks as they come within range of one another. Using a Bluetooth interface, the portable audio device 12 is able to recognize when it is in range of the external audio system 14. The Bluetooth standard also supports capability negotiation so that devices coming within range of one another are able to determine the capabilities of found devices. The portable audio device 12 implementing the Bluetooth standard may be programmed to begin transmitting an enhancement signal automatically when a compatible external audio system 14 is available or, alternatively, the portable audio device 12 could be programmed to notify the user when a compatible external audio system 14 is available. In the latter case, the user can determine whether to enable the enhancement function.

Where, automatic enabling and disabling of playback enhancement is desirable, it is advantageous to generally include delay elements 72 in the audio signal path of portable audio device 12 associated with generation of the first audible signal. With such delay being persistent, users do not perceive any audio discontinuity associated with "synchronizing" playback enhancement at audio system 14 with ongoing audio playback at portable device 12.

The Bluetooth standard supports both Synchronous Connection-Oriented (SCO) links and Asynchronous Connection-less (ACL) links. SCO links are point-to-point and do not utilize packet retransmissions. Consequently, SCO links are relatively efficient for voice/audio transmissions where individual packet data integrity is not essential. ACL links are packet-switched connections and provide for negotiated packet re-try to ensure data transmission integrity. Thus, the Bluetooth baseband protocol represents a combination of circuit and packet switching. Bluetooth can support an asynchronous data channel at over 720 Kbps, up to three simultaneous synchronous voice channels, or a combined channel that simultaneously supports asynchronous data and synchronous voice. With this latter capability, the portable device 12 can receive data, such as streaming audio from the Web for local playback through wireless link 16, while simultaneously sending its enhancement signal to audio system 14 for playback enhancement.

More particularly, portable audio device 12 may use a Bluetooth "voice" channel to transmit the enhancement signal to the external audio system 14. Such voice channels adopt a 64 Kbps data rate and use Continuously Variable Slope Delta (CVSD) encoding, which is appropriate for transferring the lower frequency audio components used to enhance audio playback. By using a CVSD voice channel, the higher rate Bluetooth data channel remains available for, as noted, receipt of streaming audio or other media content from the Web, or other uses. Of course, it should be understood that use of a Bluetooth voice channel is an efficient approach to transferring audio content for playback enhancement regardless of whether the portable audio device 12 receives streaming audio via the wireless link 16, or obtains audio data locally from, for example, local media included in audio source 24.

In general, the wireless link 16 may support additional functionality beyond the simple transfer of the enhancement signal from the portable audio device 12 to audio system 14 for playback enhancement. For example, the wireless link 16, whether or not based on a wireless networking standard, may allow the portable audio device 12 to transmit control signals to control the operation of the external audio system 14. Control signals may be used, for example, to provide volume control and muting of the second audible signal by the portable audio device 12.

Figure 5:
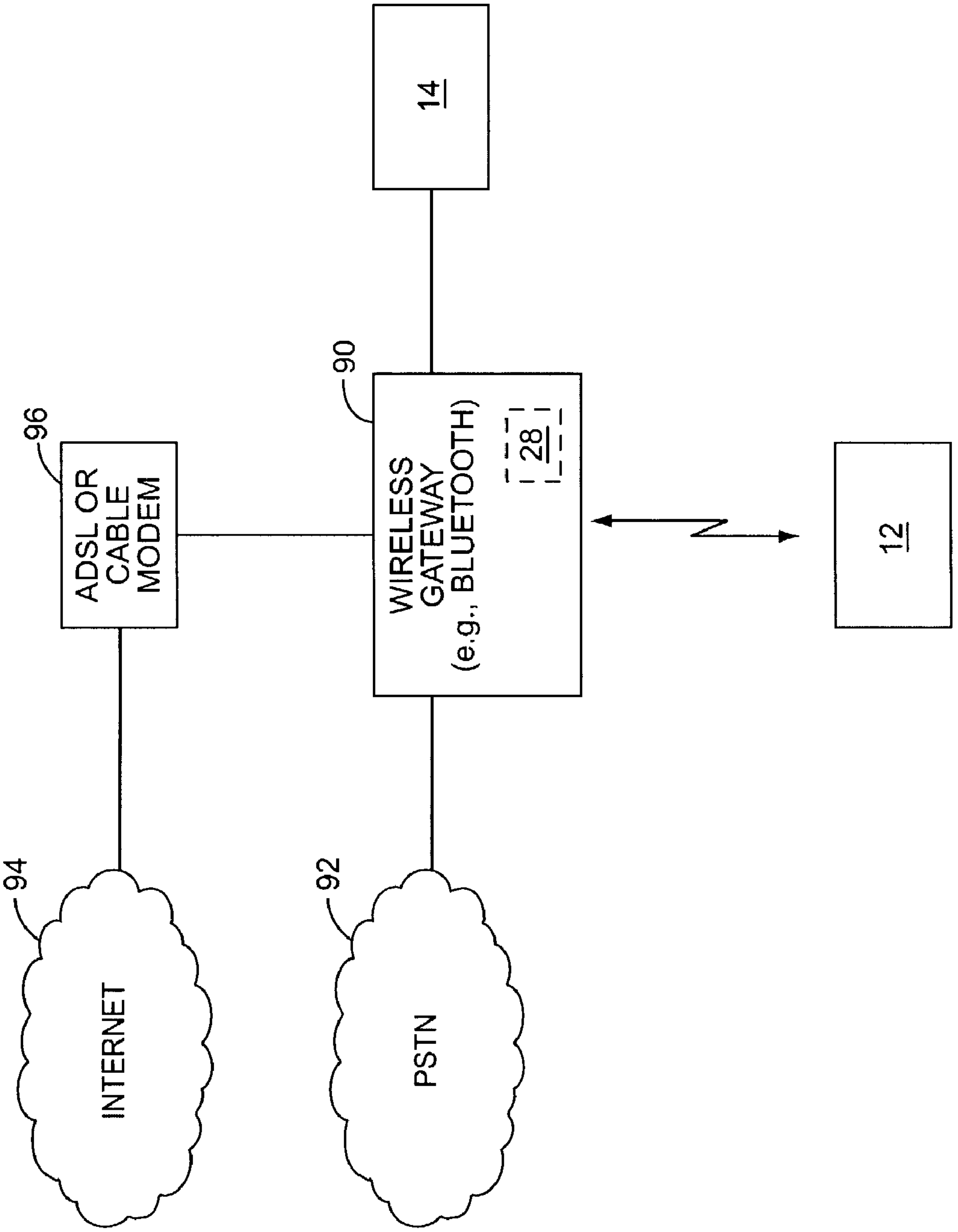
FIG. 5 is a diagram of an exemplary playback enhancement using wireless networking.

FIG. 5 provides an illustration of the flexibility and user convenience gained from wireless network-based embodiments of the present invention. Here, a wireless gateway 90, e.g., a Bluetooth-based wireless gateway, is communicatively coupled to the Public Switched Telephone Network (PSTN) 92, and to the Internet or other Public Data Network (PDN) 94 through, for example, an Asymmetric Digital Subscriber Line (ADSL) or cable modem 96. Wireless gateway 90 includes wireless interface 28, or equivalent wireless interface capability, such that it is communicatively coupled to the portable audio device 12 and can therefore receive the enhancement signal from that device for playback enhancement by external audio system 14. As such, external audio system 14 is also communicatively coupled to wireless gateway 90. Such coupling may be through a wireless channel, or wireless gateway 90 might provide a hardwired signal output to transfer received enhancement signal information to audio system 14.

In this exemplary embodiment, portable audio device 12 generally comprises a multi-use device such that it provides audio playback capability in addition to other functions or services. For example, portable audio device 12 might comprise a cellular or other wireless telephone, wireless Portable Digital Assistant (PDA), laptop computer, etc., capable of running one or more wireless communication applications in addition to its audio playback application. As such, the wireless link 16 between the portable audio device 12 and wireless gateway 90 may be used to route Web or other packet data traffic to and from the portable audio device 12, as well as to route voice call data to and from it, whether such data is associated with the PSTN 92 or the PDN 94.

In an exemplary embodiment, playback enhancement can be automatically suspended whenever an incoming call for portable device 12 is received at the wireless gateway 90, or when a user of the portable device 12 originates a call. Thus, local audio playback at the portable device 12 and enhancement playback at audio system 14 may be suspended or otherwise muted to avoid interfering with a user's voice call. As such, the wireless gateway 90 may be configured to recognize when playback enhancement is active, such that it can suspend the enhancement function responsive to the call.

As noted, that call may be carried on a Bluetooth data or voice channel via the wireless link 16. While playback is suspended, call data may be routed over the same Bluetooth voice channel as is otherwise used for playback enhancement; thus the resources used for playback enhancement are shared cooperatively with telephony or other data transfer functions.

Of course, whether the wireless link 16 is based on Bluetooth or another wireless networking standard, the adoption of a bi-directional communication link affords convenient implementation of user features discussed above, such as automatic start of playback enhancement, automatic muting, remote control of volume/muting for the second audible signal generated by the external audio system 14. Those skilled in the art will appreciate that these and other playback enhancement functions, while facilitated by the use of Bluetooth, do not depend on a particular wireless standard, and may be implemented in a variety of other ways.

Also, those skilled in the art will recognize that the wireless link 16 need not be bi-directional for basic playback enhancement; the portable device 12 may send an enhancement signal or otherwise transfer low-frequency audio information for playback enhancement using digital or analog radio transmission, using an optical transmitter/receiver arrangement, or by some other transmission means. Thus, those skilled in the art should understand that the foregoing discussion presented exemplary embodiments of the present invention and should not be construed as limiting. Indeed, the present invention is limited only by the scope of the following claims and the reasonable equivalents thereof.

What is claimed is:

1. A portable audio device comprising:

a portable audio playback unit comprising an audio circuit for generating an audio signal and at least one speaker coupled to the audio circuit, said speaker being responsive to the audio signal to generate a first audible signal; and a wireless interface coupled to the audio circuit to transmit an enhancement signal comprising low frequency components of the audio signal, the enhancement signal being derived from the audio signal to an external audio system that generates a second audible signal enhancing the first audible signal.

2. The portable audio device of claim 1 wherein the audio circuit comprises at least one delay matching element to match the delays of the first and second audible signals so that the first and second audible signals are time aligned.

3. The portable audio device of claim 2 wherein the delay matching element delays the first audible signal to match link delays associated with transmission of the enhancement signal to the external audio system.

4. The portable audio device of claim 2 wherein the delay matching element delays the first audible signal to match audible signal delays associated with output of the second audible signal from the audio system.

5. The portable audio system of claim 3 wherein the delay of the first audible signal is persistent so that transmission of the enhancement signal for enhancement of the first audible signal can be selectively enabled and disabled without creating an audible discontinuity.

6. The portable audio device of claim 1 wherein the audio circuit includes a first filter to generate the enhancement signal by filtering the audio signal.

7. The portable audio device of claim 6 wherein the first filter is a low-pass filter.

8. The portable device of claim 6 wherein the audio circuit further comprises a second filter to filter the audio signal to generate the first audible signal.

9. The portable audio device of claim 8 wherein the first and second filters form a cross-over filter.

10. The portable audio device of claim 8 wherein the first filter is a low pass filter and wherein the second filter is a high pass filter.

11. The portable audio device of claim 1 wherein the audio signal is multi-channel audio signal and wherein the audio playback unit includes at least two speakers, each outputting a respective channel of the multi-channel audio signal.

12. The portable audio device of claim 11 wherein the audio circuit further comprises a summer to generate the enhancement signal by combining two or more channels of the audio signal.

13. The portable audio device of claim 1 wherein the audio playback unit further comprises a control unit controlling the audio playback unit.

14. The portable audio device of claim 13 wherein the control unit sends control signals via the wireless interface to the external audio system to control the external audio system.

15. The portable audio device of claim 13 wherein the control unit sends volume control signals to the external audio system to control the volume of the second audible signal.

16. The portable audio device of claim 1 wherein the wireless interface comprises a digital wireless networking interface supporting communication via a digital wireless network link.

17. The portable audio device of claim 16 wherein the digital wireless network link includes a low data rate channel and wherein the enhancement signal is transmitted by said portable audio device to said external audio system over the low data rate channel.

18. The portable audio device of claim 17 wherein the low data rate channel is an unsupervised channel.

19. The portable audio device of claim 17 wherein the wireless networking interface is a Bluetooth interface and wherein the low data rate audio channel is a CVSD voice channel.

20. The portable audio device of claim 17 wherein the low data rate channel is time-shared by said audio playback unit with a telephony application for making voice calls.

21. The portable audio device of claim 20 including a playback mode during which the enhancement signal is transmitted over the low data rate channel to the external audio system, and a voice mode during which transmission of the enhancement signal is suspended and the low data rate channel is used to support a voice call.

22. The portable audio device of claim 17 wherein the wireless network link further includes a high data rate channel.

23. The portable audio device of claim 22 wherein the audio signal is derived from information received over the wireless interface on said high data rate channel.

24. The portable audio device of claim 1 wherein said wireless interface supports ad hoc networking so that said portable audio device detects availability of the external audio system for playback enhancement.

25. The portable audio device of claim 24 wherein said portable audio device automatically transmits the enhancement signal when the external audio system is available for play back enhancement.

26. The portable audio device of claim 24 wherein said portable audio device notifies a user of the portable audio device when the external audio system is available for playback enhancement.

27. An audio system comprising:

a portable audio device including a first audio circuit and at least one speaker to output a first audible signal responsive to an audio signal;

an external audio system including a second audio circuit and a woofer to enhance the first audible signal by producing a second audible signal responsive to low-frequency components of the audio signal; and a wireless link to transmit the low-frequency components of the audio signal from the portable audio device to the external audio system.

28. The audio system of claim 27 wherein the first audio circuit comprises at least one delay matching element to match delays of the first and second audible signals so that the first and second audible signals are time aligned.

29. The audio system of claim 28 wherein the at least one delay matching element delays the first audible signal to match link delays associated with the transmission of the low-frequency components of the audio signal to the external audio system.

30. The audio system of claim 29 wherein the delay of the first audible signal is persistent so that transmission of the low-frequency components of the audio signal can be selectively enabled and disabled without creating an audible discontinuity.

31. The audio system of claim 27 wherein the first audio circuit includes a first filter for filtering the first audio signal to obtain the low-frequency components of the audio signal.

32. The audio system of claim 31 wherein the first filter is a low-pass filter to output an enhancement signal including the low-frequency components of the audio signal.

33. The audio system of claim 31 wherein the first audio circuit further comprises a second filter to filter the audio signal to generate the first audible signal.

34. The audio system of claim 33 wherein the first and second filters form a cross-over filter.

35. The audio system of claim 33 wherein the first filter is a low pass filter and wherein the second filter is a high pass filter.

36. The audio system of claim 27 wherein the audio signal is multi-channel audio signal and wherein the portable audio device includes at least two speakers, each outputting a respective channel of the multi-channel audio signal.

37. The audio system of claim 36 wherein the first audio circuit further comprises a summer to obtain the low-frequency components of the multi-channel audio signal by combining two or more channels of the multi-channel audio signal.

38. The audio system of claim 27 wherein the portable audio device further comprises a control unit controlling the audio playback unit.

39. The audio system of claim 38 wherein the control unit sends control signals via the wireless interface to the external audio system to control the external audio system.

40. The audio system of claim 38 wherein the control unit sends volume control signals to the external audio system to control the volume of the second audible signal.

41. The audio system of claim 27 wherein the wireless interface comprises a digital wireless networking interface supporting communication via a digital wireless network link.

42. The audio system of claim 41 wherein the digital wireless network link includes a low data rate channel and wherein the low-frequency components of the audio signal are transmitted as an enhancement signal by the portable audio device to the external audio system over the low data rate channel.

43. The audio system of claim 42 wherein the low data rate channel is an unsupervised channel.

44. The audio system of claim 42 wherein the wireless networking interface is a Bluetooth interface and wherein the low data rate channel is a CVSD voice channel.

45. The audio system of claim 42 wherein the portable audio device time-shares the low data rate channel with a telephony application for making voice calls.

46. The audio system of claim 45 including a playback mode during which the enhancement signal is transmitted over the low data rate channel to the external audio system, and a voice mode during which transmission of the enhancement signal is suspended and the low data rate channel is used to support a voice call.

47. The audio system of claim 42 wherein the wireless network link further includes a high data rate channel.

48. The audio system of claim 47 wherein the audio signal is derived from information received over the wireless interface on the high data rate channel.

49. The audio system of claim 27 wherein the wireless interface supports ad hoc networking so that the portable audio device detects availability of the external audio system for playback enhancement.

50. The audio system of claim 49 wherein the portable audio device automatically transmits an enhancement signal comprising the low-frequency components of the audio signal when the external audio system is available for playback enhancement.

51. The audio system of claim 49 wherein the portable audio device notifies a user of the portable audio device when the external audio system is available for playback enhancement.

52. A method of enhancing audio playback of a portable audio device, the method comprising:

outputting a first audible signal from the portable audio device responsive to an audio signal; and transmitting an enhancement signal containing the low-frequency components of the audio signal over a wireless network interface from the portable audio device to an external audio system that provides bass enhancement.

53. The method of claim 52, further comprising outputting a second audible signal from the external audio system responsive to the enhancement signal, wherein the second audible signal provides bass enhancement for the first audible signal.

54. The method of claim 52 further comprising matching delays of the first and second audible signals.

55. The method of claim 54 wherein matching delays of the first and second audible signals comprises delaying the first audible signal output from the portable audio device to match a link delay associated with the transmission of the enhancement signal to the external audio system.

56. The method of claim 55 further comprising delaying the first audible signal during periods when no enhancement signal is being transmitted.

57. The method of claim 52 further comprising filtering the audio signal in a first filter to generate the enhancement signal.

58. The method of claim 57 wherein the first filter is a low pass filer that removes high frequency components of the audio signal to generate the enhancement signal.

59. The method of claim 57 further comprising filtering the audio signal in a second filter to generate the first audible signal.

60. The method of claim 59 wherein the first and second filters form a cross-over filter.

61. The method of claim 60 wherein the first filter is a low pass filter and the second filter is a high pass filter.

62. The method of claim 52 wherein the audio signal is a multi-channel audio signal and wherein the first audible signal is generated by two or more speakers.

63. The method of claim 62 further comprising combining two or more channels of the multi-channel audio signal to generate the enhancement signal.

64. The method of claim 52 further comprising sending control signals from the portable audio device to the external audio system to control the operation of the external audio system.

65. The method of claim 64 wherein controlling operation of the external audio system comprises sending volume control signals from the portable audio device to the external audio system to control the volume of the second audible signal.

66. The method of claim 52 wherein the wireless network interface provides support for a digital wireless network link.

67. The method of claim 66 wherein the digital wireless network link includes a low data rate channel and wherein the audio enhancement signal is transmitted by the portable audio device to the external audio system over the low data rate channel.

68. The method of claim 67 wherein the low data rate channel is an unsupervised channel.

69. The method of claim 68 wherein the wireless network interface is a Bluetooth interface and wherein the low data rate audio channel is a CVSD voice channel.

70. The method of claim 67 wherein the low data rate channel is time-shared by the portable audio device with a telephony application for making voice calls.

71. The method of claim 70 further comprising suspending transmission of the enhancement signal during a voice call.

72. The method of claim 67 wherein the wireless network link further includes a high data rate channel.

73. The method of claim 72 further comprising receiving audio content over the high data rate channel, wherein the audio signal is derived from the audio content received over the high data rate channel.

74. The method of claim 52 further comprising detecting availability of the external audio system for playback enhancement.

75. The method of claim 74 further comprising automatically transmitting the enhancement signal when the external audio system is available for playback enhancement.

76. The method of claim 74 further comprising notifying a user of the portable audio device when the external audio system is available for playback enhancement.

* * * * *

UNITED STATES PATENT AND TRADEMARK OFFICE

CERTIFICATE OF CORRECTION

PATENT NO. : 7,295,809 B2 
APPLICATION NO. : 10/199453
DATED : November 13, 2007
INVENTOR(S) : Richard A. Moore It is certified that error appears in the above-identified patent and that said Letters Patent is hereby corrected as shown below:

In the claims, in column 9, line 53 please make the following change: (a comma is added between the words ‘signal’ and ‘to’)

nal being derived from the audio signal, to an external

In the claims, in column 11, line 11 please make the following change:

~~play back~~ playback enhancement.

Signed and Sealed this

Fifteenth Day of April, 2008

JON W. DUDAS
*Director of the United States Patent and Trademark Office*